United States Patent
Cheng

(10) Patent No.: US 8,693,542 B2
(45) Date of Patent: Apr. 8, 2014

(54) METHOD AND DEVICE FOR ESTIMATING VIDEO NOISE

(75) Inventor: Chih-Yu Cheng, Taipei (TW)

(73) Assignee: CyberLink Corp., Xindian Dist., New Taipei (TW)

(*) Notice: Subject to any disclaimer, the term of this patent is extended or adjusted under 35 U.S.C. 154(b) by 1209 days.

(21) Appl. No.: 12/269,844

(22) Filed: Nov. 12, 2008

(65) Prior Publication Data
US 2010/0118203 A1 May 13, 2010

(51) Int. Cl.
*H04N 7/12* (2006.01)
*H04N 11/02* (2006.01)
*H04N 11/04* (2006.01)

(52) U.S. Cl.
USPC .................................................. 375/240.16

(58) Field of Classification Search
None
See application file for complete search history.

(56) References Cited

U.S. PATENT DOCUMENTS

| | | | | |
|---|---|---|---|---|
| 5,892,853 | A * | 4/1999 | Hirani et al. | 382/280 |
| 6,201,896 | B1 * | 3/2001 | Ishikawa | 382/236 |
| 6,307,888 | B1 * | 10/2001 | Le Clerc | 375/240.29 |
| 7,034,892 | B2 | 4/2006 | Ojo | |
| 7,145,607 | B1 | 12/2006 | Hui | |
| 7,295,616 | B2 | 11/2007 | Sun et al. | |
| 7,769,089 | B1 * | 8/2010 | Chou | 375/240.29 |
| 7,949,051 | B2 * | 5/2011 | Yankilevich | 375/240.24 |
| 8,149,336 | B2 * | 4/2012 | Mohanty et al. | 348/607 |
| 2006/0056724 | A1 | 3/2006 | Le Dinh et al. | |
| 2006/0215796 | A1 | 9/2006 | Lin | |
| 2008/0158427 | A1 * | 7/2008 | Chiu | 348/625 |
| 2008/0165861 | A1 * | 7/2008 | Wen et al. | 375/240.26 |

* cited by examiner

*Primary Examiner* — Andy Rao
*Assistant Examiner* — Jared Walker
(74) *Attorney, Agent, or Firm* — Winston Hsu; Scott Margo

(57) ABSTRACT

A method for estimating noise in a series of video frames includes selecting a region of a first frame, calculating high frequency quantities for the selected region, calculating temporal-domain high frequency quantities for the selected region of the frame and a mapping region of a second frame, and generating a noise estimate of the noise according to a relationship between the high frequency quantities and the temporal-domain high frequency quantities.

26 Claims, 5 Drawing Sheets

METHOD AND DEVICE FOR ESTIMATING VIDEO NOISE

BACKGROUND OF THE INVENTION

1. Field of the Invention

The present invention relates to video signal processing. More particularly, the invention relates to a method and device for estimating video noise through temporal and spatial domain high frequency quantities.

2. Description of the Prior Art

Video processing includes a body of techniques for improving quality of video data, as well as modifying the video data. Some examples of video processing techniques include size conversion, contrast enhancement, deinterlacing, edge enhancement, and noise reduction. In addition to improving quality and/or changing properties of the video data, analysis techniques are also available, such as edge detection and feature tracking, which are paving the way for advances in video compression codecs and video conferencing applications.

One type of analysis that aids in performing many of the above-mentioned video processing techniques is noise estimation. Noise estimation is typically performed in either a spatial domain or in a time domain. However, the noise estimation may be biased if the video data contains detailed or textured regions, e.g. tightly-packed leaves of a tree.

SUMMARY OF THE INVENTION

According to an embodiment of the present invention, a method for estimating noise in a series of video frames comprises selecting a region of a first frame, calculating high frequency quantities for the selected region of the first frame, calculating temporal-domain high frequency quantities for the selected region of the frame and a mapping region of a second frame, and generating a noise estimate of the noise according to a relationship between the high frequency quantities and the temporal-domain high frequency quantities.

According to the above embodiment, a noise estimation device for estimating noise in a series of video frames comprises a selecting module for selecting a region of a frame, a first calculating module for calculating a high frequency quantity for the region according to the frame, a second calculating module for calculating a temporal-domain high frequency quantity for the region according to the frame and an adjacent frame, and a noise estimation module for generating a noise estimate of the noise according to a relationship between the high frequency quantity and the temporal-domain frequency quantity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
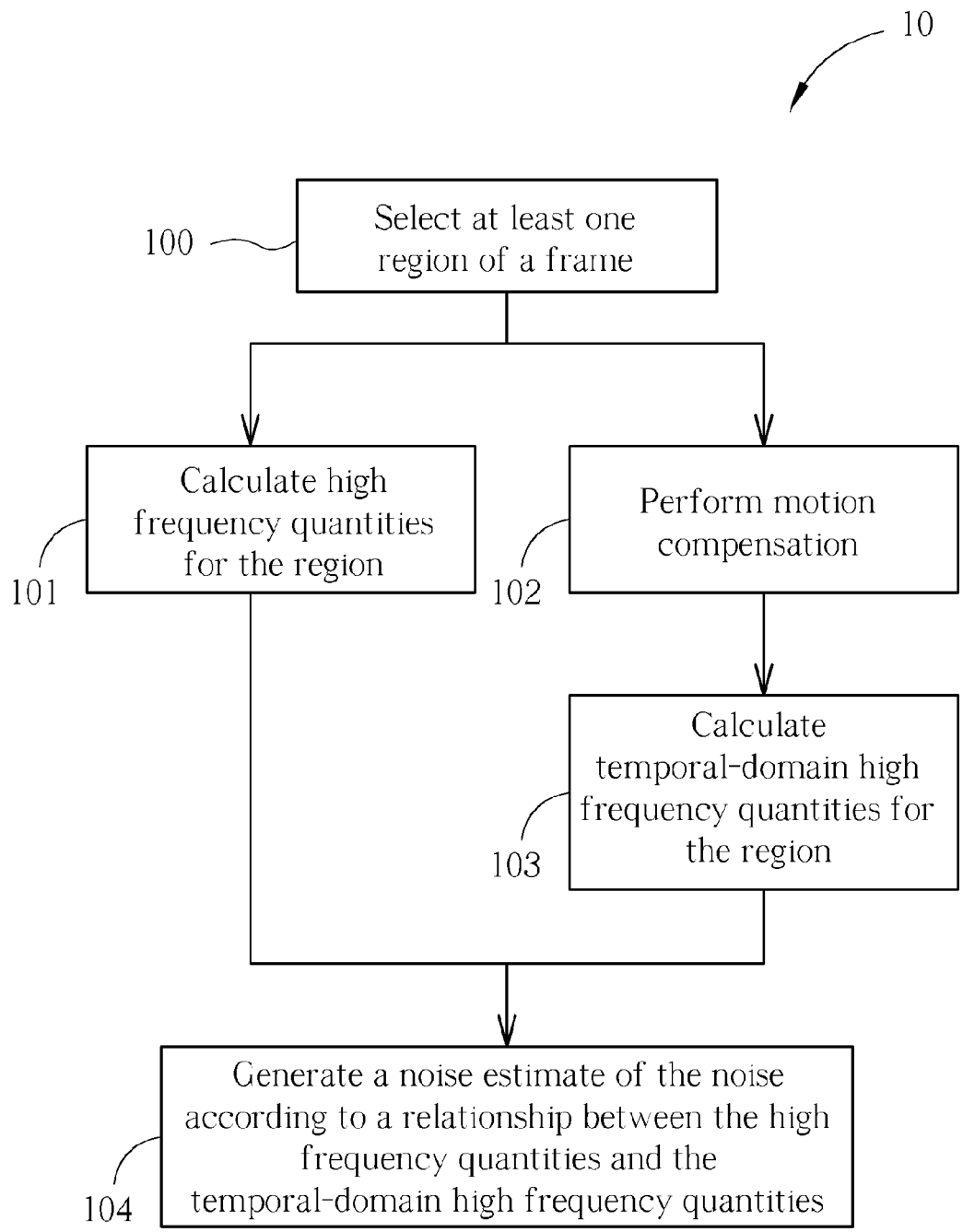
FIG. 1 is a flow chart of a method for estimating video noise according to a first embodiment of the present invention.

Noise estimation methods and a related noise estimation device embodying the present invention are used for estimating amount of noise in a video source with greater accuracy. The accurately estimated noise of the video source may be useful in video processing, e.g. noise reduction and edge enhancement, as well as in video analysis, e.g. edge detection and feature tracking. For example, a noise reduction module may use the noise estimate for adjusting noise reduction strength, so as to obtain a more optimal balance between noise reduction and feature retention. An edge enhancement module may utilize the noise estimate to reduce edge enhancement strength when the noise estimate is high, so as to avoid over-enhancing the noise, which would lower video quality. A point tracking module may reduce sensitivity when the noise estimate is high, so as to prevent noise from affecting tracking stability.

For a given region in a video frame, motion M of the region may be derived from any well-known motion estimation algorithm, a high frequency quantity Sh may be determined, and a temporal-domain high frequency quantity Th may also be determined. The high frequency quantity Sh may be determined, for example, through a relationship such as $abs(f(x, y, t) - f(x-1, y, t))$, and may be represented as $Sh = D + N$. The temporal-domain high frequency quantity Th may be determined through, for example, a block sum of absolute differences (block SAD), and may be represented as $Th = E + N$. Before calculating the temporal-domain high frequency quantity Th, motion compensation should be performed for the video. In the above, D represents detail/texture quantity in the region of the video frame, E represents an error value related to D caused by imperfect motion estimation/compensation regarding to M, and N represents noise. Without loss of generality, it may be assumed that quantities of noise in the spatial and temporal domains are approximately equal.

Using only the high frequency quantity Sh, it is unlikely for noise to be distinguishable from detail. On the other hand, using only the temporal-domain high frequency quantity Th, under normal conditions, motion estimation is imperfect due to an aperture problem, such that M comprises acceptable deviation. Hence, E is non-zero, and related to D, so that, again, it is unlikely that noise will be distinguishable from detail. Thus, a process 10 utilizes a relationship between the high frequency quantity Sh and the temporal-domain high frequency quantity Th to overcome the above-mentioned problem, and prevent image details from affecting the noise estimation result. One relationship that may be utilized is a ratio R, where $R = Sh/Th = (D+N)/(E+N)$. In general cases, if M is determined as a motion estimate with acceptable deviation, it may be inferred that $E \ll D$ and $R \approx (D+N)/(N)$. For example, M is considered the motion estimate with acceptable deviation if video frames do not change too violently in the temporal domain. Then, if the ratio R is greater than a threshold, D/N is high, and the region of the video frame most likely contains a high amount of texture. In general, the image or the video frame is for representing or visualizing the actual objects. Representing the appearance and feel of a surface of the object requires information with detailed image structure. A high amount of texture in the image means the image has complex structure and will induce a high level of the high frequency quantity Sh. Therefore, the region of the video frame is likely unreliable for use in estimating the noise level of the video frame. Otherwise, if the ratio R is less than the threshold, implying that $N > D$, $N \gg E$, the region of the video frame may be used with confidence when estimating the noise level. In this case, both R and Th may be used to estimate the noise level. It should be noted that the noise estimate may be also generated according to both R and Sh.

FIG. 1 is a flowchart diagram of the process 10 for estimating video noise according to a first embodiment of the present invention. Please simultaneously refer to FIGS. 3-5, which are diagrams of images respectively having high texture, relatively high noise, and relatively low noise. The images shown in FIGS. 3-5 may be considered video frames that are respectively parts of corresponding videos. Whereas FIG. 3 shows a video frame with a background that comprises a high amount of texture, FIGS. 4 and 5 show video frames with relatively low amounts of texture and different amounts of noise.

Figure 3:
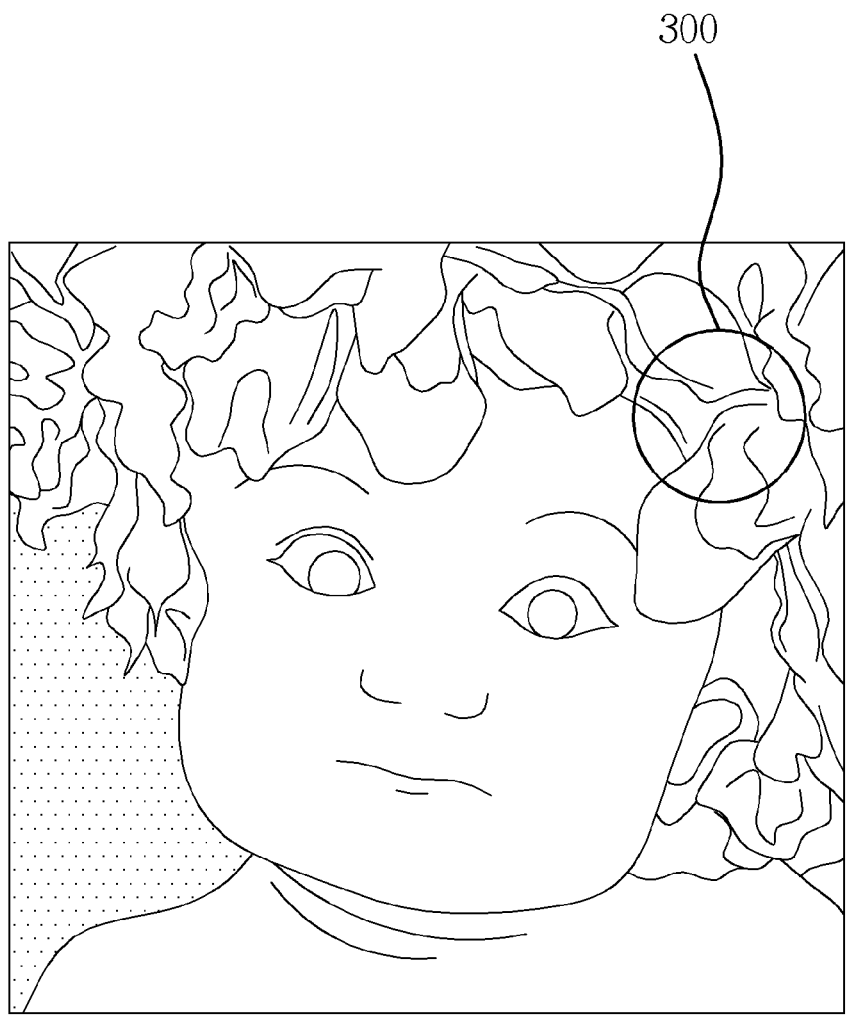
FIG. 3 is a diagram of an image having high texture regions.
Figure 4:
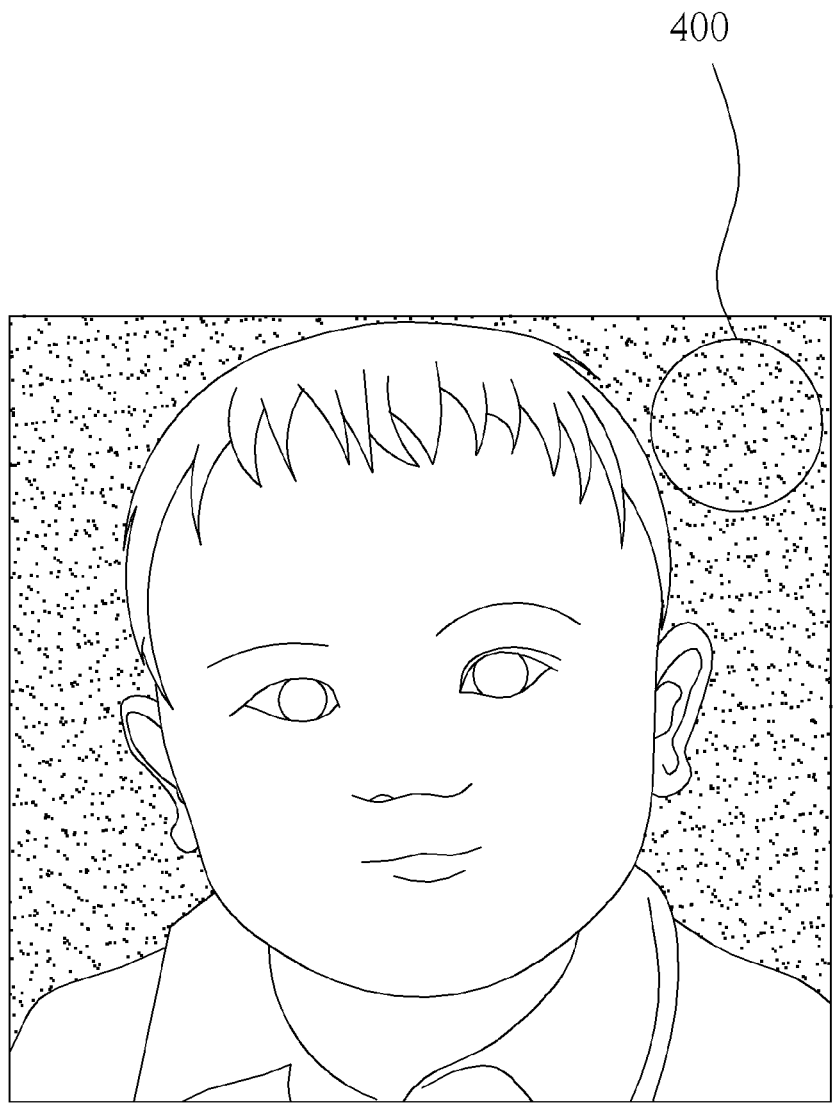
FIG. 4 is a diagram of an image having relatively high noise regions.
Figure 5:
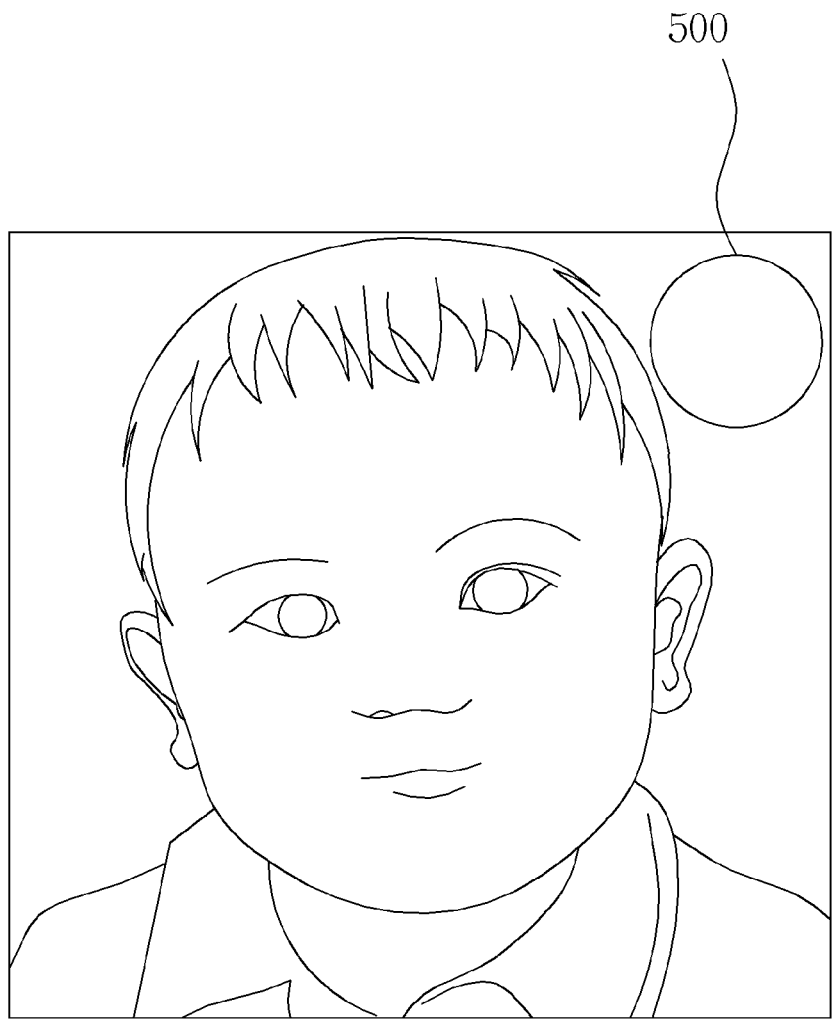
FIG. 5 is a diagram of an image having relatively low noise regions.

In the process 10, at least one region of at least one video frame is selected (Step 100), e.g. a region 300 of the video frame shown in FIG. 3, a region 400 of the video frame shown in FIG. 4, or a region 500 of the video frame shown in FIG. 5. Then, the high frequency quantity may be calculated for the selected region of the at least one video frame (Step 101). Either a first derivative quantity or a variance may be calculated for each of the regions in the spatial domain to generate the high frequency quantity. For example, in the region 300, the high frequency quantity Sh1 is calculated to be 9744, in the region 400, the high frequency quantity Sh2 is calculated to be 3794, and, in the region 500, the high frequency quantity Sh3 is calculated to be 1145. Additionally, the high frequency quantities may be calculated easily in the frequency domain. In some cases, the frame may be transformed from the spatial domain into the frequency domain through one process of a Fast Fourier Transform (FFT), a Discrete Cosine Transform (DCT), and a Wavelet transform. Afterward, the high frequency quantities can be calculated by simply summing coefficients of the high frequency bands. For example, the coefficients of the highest 50%, 70%, or 90%, etc. frequency bands may be summed up to generated the high frequency quantities. In addition, the high frequency quantities may also be calculated through summing part of the coefficients described above. In the frequency domain, each coefficient represents energy of the corresponding frequency band.

Before the temporal-domain high frequency quantity is calculated for the selected region of the frame and the mapping region of an adjacent frame (Step 103), the mapping region of the adjacent frame may be determined according to the motion compensation performed for the video in Step 102. More particularly, the motion vector is determined according to the motion compensation and is presented as a spatial shift between the selected region of the frame and the mapping region of the adjacent frame. In other words, the mapping region of the adjacent frame may be determined according to the selected region and the motion vector. In another embodiment, the mapping region is the region with the same location corresponding to the selected region while the motion vector is zero. It should be noted that the adjacent frame may be either an adjoining frame or a nearby frame relative to the frame. A first derivative quantity may be calculated for the selected region in the temporal domain to generate the temporal-domain high frequency quantity. For example, a sum of absolute differences may be calculated for the selected region in the temporal domain to generate the temporal-domain high frequency quantity. In the region 300, the temporal-domain high frequency quantity Th1 is calculated to be 4259, in the region 400, the temporal-domain high frequency quantity Th2 is calculated to be 3545, and, in the region 500, the temporal-domain high frequency quantity Th3 is calculated to be 1193.

Finally, the noise estimate is generated according to a relationship between the high frequency quantity and the temporal-domain high frequency quantity (Step 104). In an embodiment, the relationship is a ratio R calculated based on the high frequency quantity Sh and the temporal-domain high frequency quantity Th. Then, in the region 300, the ratio R1 is calculated to be 2.29, in the region 400, the ratio R2 is calculated to be 1.07, and, in the region 500, the ratio R3 is calculated to be 0.96. Therefore, the noise estimate may be generated according to the ratio R between the high frequency quantity Sh and the temporal-domain high frequency quantity Th. A predetermined threshold may be defined by at least one of a user and a video processing system in advance. The region may be determined to be a region with high texture if the ratio R is larger than the predetermined threshold. Otherwise, the region may be determined to be a region without high texture if the ratio R is either equal to or less than the predetermined threshold. The predetermined threshold may be normalized (for example, set to 1) in some embodiments, such as in FIGS. 3-5. Because the ratio R1 is greater than the predetermined threshold (2.29>1), the FIG. 3 is determined to be a figure with high texture. Likewise, R2 and R3 similarly approximate the predetermined threshold ($1.07\approx1$; $0.96\approx1$), such that both FIG. 4 and FIG. 5 are determined to be figures without high texture. It should be noted that normalizing the predetermined threshold is not necessary in other embodiments regarding this invention.

To determine whether the region has relative high noise, the high frequency quantities may further be compared with a reference Sh, or the temporal-domain high frequency quantities may also further be compared with a reference Th. The reference Sh and the reference Th may both be predetermined by the user or by the video processing system in advance. In the embodiment, if the high frequency quantities are larger than the reference Sh, and/or if the temporal-domain high frequency quantities are larger than the reference Th, the region may be determined to have relative high noise. For example, if the reference Th is predetermined to 2000, the temporal-domain high frequency quantity Th2 (3545) is greater than the reference Th (2000), and the temporal domain high frequency quantity Th3 (1193) is less than the reference Th (2000). Thus, the region 400 in FIG. 4 may be determined to have relative high noise, and the region 500 in FIG. 5 may be determined to have relative low noise. In the embodiment, the value of the reference Th may be predetermined by a user. Of course, the value of the reference Th may also be determined by the video processing system.

Once the noise estimate has been calculated (Step 104), the noise estimate may be sent to a predetermined video processing function of the video processing system. For example, the video processing system may perform one of reducing noise, enhancing an edge, detecting an edge, and tracking a feature for improving quality of the video more accurately according to the noise estimate.

Figure 2:
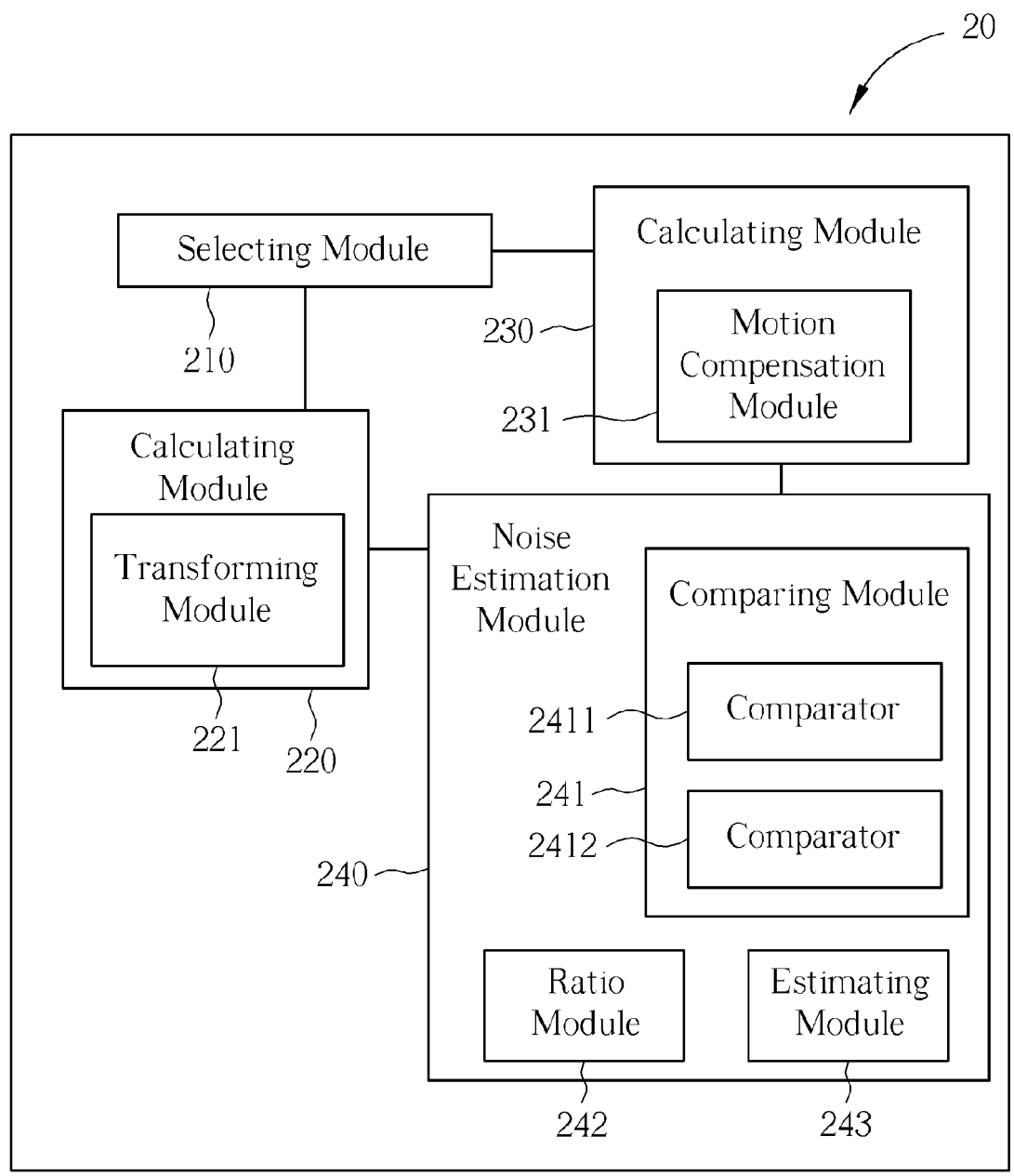
FIG. 2 is a diagram of an embodiment of a noise estimation device for performing the method of FIG. 1.

FIG. 2 is a diagram of a noise estimation device 20 configured to estimate noise in a series of video frames embodying the method of FIG. 1. The noise estimation device 20 comprises a selecting module 210, a first calculating module 220, a second calculating module 230, and a noise estimation module 240.

The embodiments disclosed herein can be implemented in hardware, software, firmware, or a combination thereof. At least one embodiment disclosed herein may be implemented in software and/or firmware that is executed by a general-purpose processor within a computer system. And, one or more of the embodiments disclosed herein can be implemented with a discrete logic circuit(s) having logic gates for implementing logic functions upon data signals, an application specific integrated circuit (ASIC) having appropriate combinational logic gates, a programmable gate array(s)

(PGA), a field programmable gate array (FPGA), and the combination thereof to provide the corresponding functions.

The selecting module 210 is for selecting a region of a frame. The first calculating module 220 is configured to calculate a high frequency quantity Sh of the region. The Sh may be generated by calculating at least one of a first derivative quantity and a variance for the region according to the frame in a spatial domain. In addition, the first calculating module 220 may comprise a transforming module 221 for transforming the frame from the spatial domain into a frequency domain. For example, the frame may be transformed through one process of a Fast Fourier Transform, a Discrete Cosine Transform, and a Wavelet Transform. In this embodiment, the first calculating module may further be configured to calculate the high frequency quantity for the region according to the frame in the frequency domain after the frame is transformed from the spatial domain into the frequency domain.

The second calculating module 230 is configured to calculate a temporal-domain high frequency quantity Th of the region according to the frame and an adjacent frame. It should be noted that the adjacent frame may be either an adjoining frame or a nearby frame relative to the frame. Furthermore, the second calculating module 230 comprises a motion compensation module 231 for performing motion compensation for the video prior to calculating the temporal-domain high frequency quantity Th. The second calculating module 220 may further be configured to calculate a first derivative quantity for the region according to the frame and the adjacent frame in the temporal domain to generate the temporal-domain high frequency quantity. For example, the first derivative quantity in the temporal domain may be a sum of absolute differences.

The noise estimation module 240 comprises a comparing module 241, a ratio module 242 for generating a ratio R of the high frequency quantity Sh and the temporal-domain high frequency quantity Th, and an estimating module 243 for generating the noise estimate. The noise estimation module 240 is for generating a noise estimate of the noise according to a relationship between the high frequency quantity Sh and the temporal-domain frequency quantity Th. In an embodiment, the relationship is the ratio R described above. The comparing module 241 is for comparing the ratio R with a predetermined threshold, which may be defined by at least one of the user and the noise estimation device in advance. The comparing module 241 may further comprise a first comparator 2411 for comparing the high frequency quantity with a reference Sh, and a second comparator 2412 for comparing the temporal-domain high frequency quantity with a reference Th. The reference Sh and the reference Th are both predetermined by at least one of the user and the noise estimation device. The noise estimate of the noise may be generated further according to at least one of the high frequency quantity Sh and the temporal-domain high frequency quantity Th.

The process 10 and the noise estimation device 20 utilize the high frequency quantity Sh and the temporal-domain high frequency quantity Th to determine the ratio R, which increases the accuracy of the noise estimate by reducing the effect of detail/texture on the noise estimate.

Those skilled in the art will readily observe that numerous modifications and alterations of the device and method may be made while retaining the teachings of the invention.

What is claimed is:

1. A method for estimating noise in a series of video frames, the method comprising:
   selecting a region of a first frame;
   calculating spatial-domain high frequency quantities for the selected region of the first frame;
   calculating temporal-domain high frequency quantities for the selected region of the first frame and a mapping region of a second frame, wherein the mapping region is determined according to a spatial shift of motion compensation; and
   generating a noise estimate of the noise according to a relationship including a ratio R between the spatial-domain high frequency quantities and the temporal-domain high frequency quantities, where R=Sh/Th=(D+N)/(E+N), wherein Sh represents the spatial-domain high frequency quantities, Th represents the temporal-domain high frequency quantities, D represents a detail/texture quantity, E represents an error value, and N represents noise.

2. The method of claim 1, wherein the mapping region of the second frame is determined according to a location of the selected region of the first frame.

3. The method of claim 1, wherein the mapping region of the second frame is presented as a shift of the selected region between the first frame and the second frame.

4. The method of claim 1, wherein the spatial-domain high frequency quantities are generated by calculating a first derivative quantity for the selected region of the first frame in a spatial domain.

5. The method of claim 1, wherein the spatial-domain high frequency quantities are generated by calculating a variance for the selected region of he first frame in a spatial domain.

6. The method of claim 1, further comprising transforming the first frame from a spatial domain into a frequency domain.

7. The method of claim 1, wherein the temporal-domain high frequency quantities are generated by calculating a first derivative quantity for the selected region of the first frame and the mapping region of the second frame in a temporal domain.

8. The method of claim 1, wherein the temporal-domain high frequency quantities are generated by calculating a sum of absolute difference for the selected region of the first frame and the mapping region of the second frame in a temporal domain.

9. The method of claim 1, further comprising comparing the ratio R with a predetermined threshold, wherein the predetermined threshold is defined by at least one of a user and a video processing system.

10. The method of claim 9, further comprising determining whether the region is without high texture based on the relationship between the high frequency quantities and the temporal-domain high frequency quantities.

11. The method of claim 10, wherein the region is determined to be without high texture if the ratio R is either equal to or less than the predetermined threshold.

12. The method of claim 10, further comprising at least one of:
   comparing the spatial-domain high frequency quantities with a first reference if the region is determined without high texture; and
   comparing the temporal-domain high frequency quantities with a second reference if the region is determined without high texture;
   wherein the first reference and the second reference are both predetermined by at least one of the user and the video processing system.

13. The method of claim 12, wherein the region is determined to be a region with relative high noise according to at least one of the compared results comprising:
   the spatial-domain high frequency quantities are larger than the first reference; and
   the temporal-domain high frequency quantities are larger than the second reference.

14. The method of claim 1, wherein the noise estimate of the noise is generated further according to at least one of the spatial-domain high frequency quantities and the temporal-domain high frequency quantities.

15. The method of claim 1, further comprising at least one of:
   reducing noise according to the noise estimate of the noise;
   enhancing an edge according to the noise estimate of the noise;
   detecting an edge according to the noise estimate of the noise; and
   tracking a feature according to the noise estimate of the noise.

16. The method of claim 1, wherein the second frame is adjacent to the first frame.

17. A noise estimation device for estimating noise in a series of video frames, the noise estimation device comprising:
   a selecting circuit selecting a region of a frame;
   a first calculating circuit calculating a spatial-domain high frequency quantity for the region according to the frame;
   a second calculating circuit calculating a temporal-domain high frequency quantity for the region of the frame and a mapping region of an adjacent frame, wherein the mapping region is determined according to a spatial shift of motion compensation; and
   a noise estimation circuit generating a noise estimate of the noise according to a relationship including a ratio R between the spatial-domain high frequency quantity and the temporal-domain frequency quantity, where $R=Sh/Th=(D+N)/(E+N)$, wherein Sh represents the spatial-domain high frequency quantity, Th represents the temporal-domain high frequency quantity, D represents a detail/texture quantity, E represents an error value, and N represents noise.

18. The device of claim 17, wherein the first calculating circuit is further configured to calculate at least one of:
   a first derivative quantity for the region according to the frame in a spatial domain to generate the spatial-domain high frequency quantity; and
   a variance for the region according to the frame in the spatial domain to generate the spatial-domain high frequency quantity.

19. The device of claim 17, wherein the first calculating circuit further comprises a transforming circuit transforming the frame from a spatial domain into a frequency domain.

20. The device of claim 17, wherein the second calculating circuit further comprises a motion compensation circuit performing motion compensation for the video before calculating the temporal-domain high frequency quantity.

21. The device of claim 20, wherein the second calculating circuit is further configured to calculate at least one of:
   a first derivative quantity for the region according to the frame and the adjacent frame in a temporal domain to generate the temporal-domain high frequency quantity; and
   a sum of absolute differences for the region according to the frame and the adjacent frame in the temporal domain to generate the temporal-domain high frequency quantity.

22. The device of claim 17, wherein the noise estimation circuit further comprises:
   a ratio circuit generating the ratio R of the spatial-domain high frequency quantity and the temporal-domain high frequency quantity, wherein the relationship is the ratio R;
   a comparing circuit comparing the ratio R with a predetermined threshold, wherein the predetermined threshold is defined by at least one of a user and the noise estimation device; and
   an estimating circuit generating the noise estimate.

23. The device of claim 22, wherein the comparing circuit further comprises:
   a first comparator comparing the spatial-domain high frequency quantity with a first reference; and
   a second comparator comparing the temporal-domain high frequency quantity with a second reference;
   wherein the first reference and the second reference are both predetermined by at least one of the user and the noise estimation device.

24. The device of claim 17, wherein the noise estimate of the noise is generated further according to at least one of the spatial-domain high frequency quantity and the temporal-domain high frequency quantity.

25. The method of claim 1, wherein $Sh=D+N$, $Th=E+N$, D represents the detail/texture quantity in the selected region of the first frame, and E represents the error value related to D caused by imperfect motion estimation/compensation regarding to motion of the selected region of the first frame, wherein E is non-zero.

26. The device of claim 17, wherein $Sh=D+N$, $Th=E+N$, D represents the detail/texture quantity in the region of the frame, and E represents the error value related to D caused by imperfect motion estimation/compensation regarding to motion of the region of the frame, wherein E is non-zero.

* * * * *